Nov. 29, 1966  K. J. KNUDSEN  3,287,978
ELECTRICAL BRIDGE CIRCUIT
Filed Oct. 23, 1963

INVENTOR.
Knud J. Knudsen
BY
AGENT

United States Patent Office 3,287,978
Patented Nov. 29, 1966

3,287,978
ELECTRICAL BRIDGE CIRCUIT
Knud J. Knudsen, Middlebury, Conn., assignor to Lewis Engineering Company, Naugatuck, Conn., a corporation of Connecticut
Filed Oct. 23, 1963, Ser. No. 318,389
6 Claims. (Cl. 73—362)

This invention relates to electrical bridge circuits, and more particularly to resistive bridges of the type having a potentiometer element.

Heretofore, bridge circuits of the above type have utilized non-linear heat-responsive transducers, and potentiometers connected thereto wherein the latter were provided with a number of critical taps for the purpose of matching the bridge system to the non-linear transducer. Such arrangement had a number of disadvantages. Accuracy was adversely affected an appreciable extent by changes in the resistance of the leads between the transducer and the bridge, also by leads which had appreciable length whereby their resistance was relatively high. Thus, the length of the leads from the non-linear transducer was greatly restricted, due to the non-linearity of the device. Such non-linearity also had the drawback that the accuracy was adversely affected if the lead resistance changed with changes in ambient temperature.

A further drawback of this prior type of bridge system involved the potentiometer itself. It is not feasible commercially to make a potentiometer wherein the end-to-end resistance is held to very close limits. Commercial variations in such end-to-end resistance vary from a −0 to a +5%. This condition also necessitated the provision of taps on the potentiometer, to enable more accurate resistance values to be obtained substantially at the ends.

The above disadvantages and drawbacks of prior bridge circuits of the type mentioned are obviated by the present invention, and one object of the present invention is to provide a novel and improved, especially accurate bridge network wherein the accuracy is independent of the resistance of the leads from the transducer to the bridge, such that especially long leads having relatively high resistance may be readily utilized while still obtaining an instrument of high overall accuracy.

Another object of the invention is to provide an improved bridge circuit as above set forth, wherein changes in the lead resistance to the transducer, as may be effected by changes in ambient temperature, will not adversely affect to an appreciable extent the accuracy of the instrument.

Still another object of the invention is to provide an improved electrical bridge circuit as above characterized, wherein great accuracy is obtained without requiring critical taps or, in fact, any taps whatsoever on the potentiometer unit, and without requiring the end-to-end resistance of such unit to be held between critical or close limits.

A feature of the invention resides in the provision of an improved bridge circuit or system as above outlined, wherein a linear potentiometer having a non-critical end-to-end resistance as commercially available at the present time, may be utilized in combination with a linear heat-responsive transducer, in an equal-arm bridge to provide the above advantages of accuracy, non-dependence on closely held lead resistances or on taps associated with the potentiometer device.

A still further object of the invention is to provide an improved electrical bridge circuit in accordance with the foregoing, wherein the temperature-responsive transducer or other variable element or arm may be located at a very remote point from the remainder of the bridge circuit, without adversely affecting the accuracy of the instrument.

Other features of the invention reside in the simplicity of the circuitry of the bridge system, in the use of relatively few components which are readily available commercially, and in the high degree of reliability and the foolproof operation not requiring frequent servicing, as well as the ability to operate with great accuracy over an extended range of values of the variable, such as temperature, etc.

Still other features and advantages will hereinafter appear.

In the drawings accompanying this specification, similar characters of reference are used to designate like components throughout the several views, in which.

Figure 1:
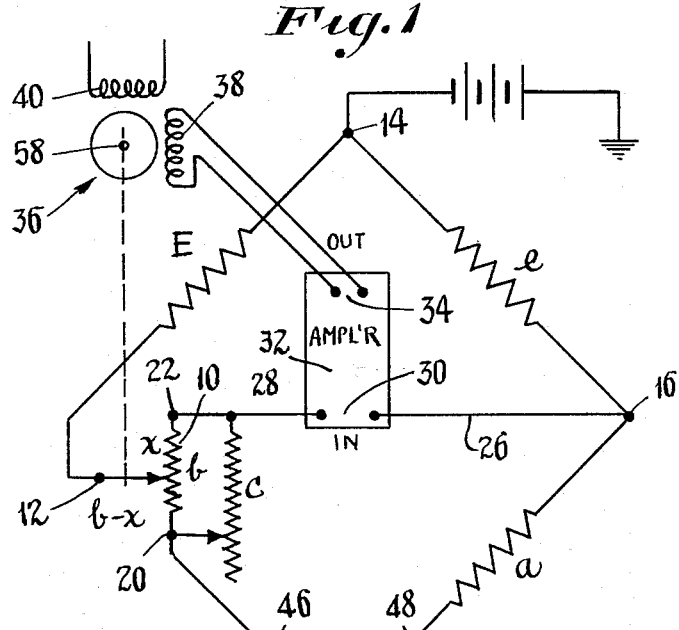
FIG. 1 is a schematic circuit diagram of the improved electrical bridge circuit as provided by the invention.

Considering first FIG. 1, there is shown a bridge system having four arms comprising resistors $E$, $e$, $a$ and $d$, as well as a potentiometer resistor, the latter being labelled 10. Corner junctions or terminal points of the bridge are designated by the numerals 12, 14, 16, 18, 20 and 22. The terminals 20, 22 constitute the end points of the potentiometer resistance 10, and the terminal or junction 12 constitutes the movable arm or slider connection of the potentiometer.

Between the terminals or junctions 12, 14, the resistive element $E$ is connected. Between the junctions 14, 16 the resistive element or arm $e$ is connected, and the resistive element or arm $a$ is connected between the junction or terminal points 16, 18.

The terminal points 16, 22 are connected respectively by wires 26, 28 to input terminals 30 of an amplifier or other electro-responsive instrument 32. Such instrument as is well known, may comprise a galvanometer, D'Arsonval instrument or the like, as well as a vacuum tube or transistor amplifier, etc., as will be well understood. The instrument 32 is indicated as being an amplifier having output terminals 34 which are connected to control a servo-type rotary machine 36. The servo-motor 36 has a control winding 38 connected to the output terminals 36 of the amplifier 32, and has an exciter winding 40 which is connected to a suitable source of alternating exciting voltage (not shown). The output of the amplifier 32 may also constitute an alternating voltage capable of being phase displaced in accordance with changes in the amplifier input, thereby to effect rotation of the motor armature 36 in either of opposite directions. Such servo-mechanism and amplifier controlling the same are well understood in the art, and accordingly further details are not given herein. It will suffice to say that if a D.C. voltage of one polarity is impressed on the terminals 30 it will effect rotation of the motor armature 36 in one direction, and if the D.C. voltage is applied which is of the opposite polarity, it will effect an opposite rotation of the servo-motor armature 36. The motor armature 36 is mechanically coupled to the potentiometer slider connected to the terminal 12, thereby to effect opposite movements or travel of the slider along the potentiometer resistor 10 in response to opposite turning movements of the motor armature 36.

In accordance with the present invention, the end-to-end resistance of the potentiometer element 10 need not be critically held, but instead may be that found to be commercially feasible, as for example with −0 and +5% variation. In order to compensate for such variation and to provide an exact end-to-end resistance, the invention provides a shunt resistor $c$ which is connected across the ends of the potentiometer resistor 10. The value of the shunt resistor $c$ is so chosen as to provide the desired exact end-to-end resistance of the shunt network including the potentiometer element 10. For this purpose, the shunt resistor *c* may be the variable type, or else it may be a selected resistor having the required correct value for a particular end-to-end resistance which the commercially available potentiometer device is found to have.

The potentiometer resistor 10 is of the linear type, having a positive temperature coefficient of resistance and in conjunction with the shunting resistor *c* which is of negative coefficient of resistance material, it will have a linear characteristic between the exact end-to-end resistance which might be desired.

In conjunction with the shunted linear potentiometer as above set forth, the invention further provides a linear transducer *d* which may be located at a point remote from the remainder of the bridge system and connected thereto by a relatively long cable 44 comprising the two wires 46, 48 which, while not shown in FIG. 1 as having the same length, will be understood as having equal resistance values and being approximately of equal length for convenience of construction of the cable. With the present bridge system it is not necessary for the wires 46, 48 to have exactly the same length but only to have the same resistance.

The linear resistive transducer *d* is shown as comprising three series-connected resistors 50, 52 and 54. The resistor 50 may be of the type having a resistance versus temperature curve which is concave upward. The resistor 52 may be of the type having a resistance versus temperature curve which is concave downward, and the resistor 54 may be of 0 temperature coefficient of resistance, having a value which will provide a given desired end-to-end resistance of the series string 50–54 comprising the transducer *d*.

A linear transducer of the above type is described in detail and claimed in my copending application Serial No. 309,932, filed September 19, 1963, and entitled "Resistor-Type Temperature-Responsive Transducer," and now abandoned. Further details of such transducer are accordingly not given herein.

The bridge system as above set forth is also arranged so that the resistive arms E and *e* are of equal resistance value, such value being relatively high with respect to the resistance values of the arms *a*, *d* and 10.

By the foregoing organization a bridge type control device is provided having the advantages of a high degree of accuracy, such accuracy being not adversely affected by the length or resistance of the cable 44, nor by changes in the resistance of such cable due to changes in ambient temperature. Moreover, commercially available potentiometer devices may be utilized, which are of the type not provided with taps that require critical operations and increase the cost of the instruments. Instead, commercially available potentiometer units may be utilized in conjunction with the shunting resistor *c*. The connecting cable 44 may be of appreciable length and may have a high resistance without adversely affecting the accuracy, and accordingly the transducer *d* may be located remote from the remainder of the bridge system. Such system is therefore specifically well adapted for use in a self-balancing servo instrument with digital readout. However, the servo instrument may also have an analog readout with a pointer, as well as a mechanical output like a shaft 58 on the motor armature 36.

A specific example of a bridge system of the above type is now given herewith. The transducer *d* may have a low resistance of 180 ohms at a temperature of −70° C., a "center" resistance of 290 ohms at 40° C., and a high resistance of 400 ohms at 150° C. The potentiometer element 10 may have a nominal resistance of 231 ohms, and the shunting resistor *c* may have a resistance of 4,620 ohms.

The potentiometer resistor 10 may be considered as divided into a portion *x* located between the slider terminal 12 and the terminal 22, and a remaining portion *b*−*x* located between the terminal 12 and the end terminal 20. When *x* is equal to ½*b* the resistance of the potentiometer and shunt which might be considered as in series with the arm E will have its highest value, and such value will be on the order of 2.75 ohms, as will be later explained. For such value, a reasonable accuracy of the bridge circuit is obtained when the values of E and *e* are sufficiently great so as to result in the 2.75 ohm value having no significant influence. Values of E and *e* on the order of 28,000 ohms or more will cause the error of the bridge to be less than 0.01%. Such high values will also cause the accuracy of the bridge to be influenced to a lesser extent by contact resistance. In the bridge network of FIG. 1, the resistors E and *e* are selected to have values of 30,000 ohms each. The resistor *a*, of zero temperature coefficient, has a value of 400 ohms.

With the above organization and using the linear transducer *d* as specified, the error is less than 0.1° C. when the resistance of the connecting cable 44 is changed from virtually 0 ohm to approximately 400 ohms, with the transducer *d* at 40° C. where the error is normally the greatest.

Equations relating to the bridge circuit of FIG. 1, and setting forth the factors which influence the value of *x*, are now given.

It will be understood that the quantity *x* can be considered as the mechanically adjusted or bridge-controlled entity which effects the bridge balance and which also, by its state or position, is indicative of the condition being monitored or measured, as for example the temperature to which the transducer *d* is subjected.

Kirchoff's second law may be applied, as follows: For a condition of balance of the bridge, where I=current through *d* or E (I) $$V = EI + \frac{(b-x)(c+x)}{b+c} I + dI$$

Also, where *i*=current through *a* and *e*, (II) $$V = ei + ai$$

For a balanced condition of the bridge, (III) $$ai = dI + \frac{(b-x)(c+x)}{b+c} \left[\frac{c}{c+x}\right] I$$

In these equations, the term EI is the voltage drop from point 14 to point 12. The term $$\frac{(b-x)(c+x)I}{b+c}$$

is the voltage drop from 12 to 20. The term *dI* is the voltage drop from 20 to 18. *ei* is the voltage drop from the point 14 to the point 16. *ai* is the drop from 16 to 18. And $$\frac{(b-x)(c+x)}{b+c}\left(\frac{c}{c+x}\right)I$$

is the voltage drop from the point 22 to the point 20.

The voltage drop from the point 12 to the point 22 is $$\frac{(b-x)(c+x)}{(b+c)}\left(\frac{x}{c+x}\right)I$$

The resistance between the points 12 and 22 is $$\frac{(b-x)(c+x)}{(b+c)}\left(\frac{x}{c+x}\right)$$

and in the given example it has a value of 2.75 ohms when the potentiometer is at its midpoint. This value is of small consequence due to the high ohmage (30,000) of the arm E, and therefore the error due to insertion of the expression as a term in Equation I above would cause, at the worst, an error of only .055° C., this occurring at a transducer temperature of 40° C., as will appear later.

Equation I, with the 2.75 ohmage term subtracted from its right side, then becomes:

(IV)
$$\frac{V}{I} = d + \frac{(b-x)(c+x)}{b+c} - \frac{(b-x)(c+x)}{b+c}\left(\frac{x}{c+x}\right) + E$$

For a balanced bridge, the voltage drop from point 22 to point 18 will equal the voltage drop from point 16 to point 18. This latter voltage drop will be:

(V)
$$V\left(\frac{a}{a+e}\right)$$

The voltage drop from 22 to 18 is:

(IV)
$$\frac{I(b-x)(c+x)}{b+c} - \frac{I(b-x)(c+x)}{b+c}\left(\frac{x}{c+x}\right) + Id$$

equating these and dividing by I gives:

(VII)
$$d + \frac{(b-c)(c+x)}{b+c} - \frac{(b-x)(c+x)}{b+c}\cdot\frac{x}{(c+x)} = \frac{a}{(a+e)}\cdot\frac{V}{I}$$

Equation IV is now divided by VII, as follows:
The function
$$\frac{(b-x)(c+x)}{(b+c)} - \frac{(b-x)(c+x)}{(b+c)}\cdot\frac{x}{(c+x)} = \frac{(b-x)(c+x)}{(b+c)} -$$
$$\frac{(b-x)x}{(b+c)} = \frac{(b-x)(c+x)-(b-x)x}{b+c} =$$
$$\frac{(b-x)(c+x-x)}{b+c} = \frac{(b-x)c}{b+c}$$

Call this expression Z. Equations IV and VII will then be as follows:

(VIII)
$$d + Z + E = \frac{V}{I}$$

and since $E = e$ (IX)
$$d + Z = \frac{a}{(a+E)}\cdot\frac{V}{I}$$

Dividing VIII by IX gives
$$\frac{d+Z+E}{d+Z} = \frac{a+E}{a}$$

Cross multiplying, $ad + aZ + aE = ad + dE + aZ + EZ$. Eliminating terms: $aE = dE + EZ$, from whence
$$a = d + Z \text{ or } a - d = Z$$

Inserting the value for Z gives:
$$(a-d) = \frac{(b-x)c}{b+c}$$

Solving for $b-x$ (X)
$$\frac{(a-d)(b+c)}{c} = b-x$$

or (XI)
$$x = b - \frac{(a-d)(b+c)}{c}$$

From this it is seen that $x$ is independent of E and $e$.

Assuming that the lowest ohmage of the transducer $d$ (namely $d_b$) makes the potentiometer arm shift to the very top, to terminal 22, the following holds:

(XII)
$$\frac{bc}{b+c} + d_b = a$$

or (XIII)
$$\frac{bc}{b+c} = a - d_b$$

Also, assuming the highest ohmage of the transducer $d$, namely the $d_t$ value, makes the potentiometer arm shift to the very bottom or to terminal 20, the following holds: (since there is no current in $b+c$ in parallel, these are ignored)

(XIV)
$$d_t = a$$

and
$$a - d_t = 0$$

also
$$x = b$$

or
$$b - x = 0$$

Figure 2:
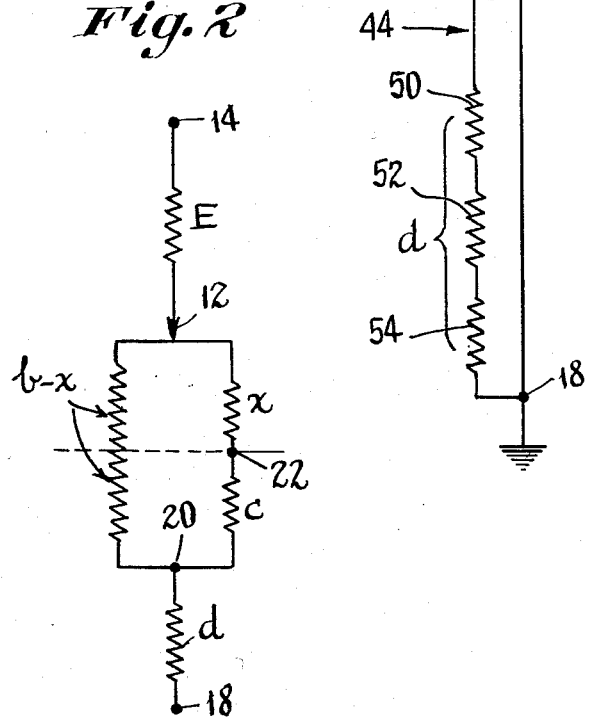
FIG. 2 is a schematic circuit diagram of the potentiometer portion, and immediately associated resistive elements only of the bridge circuit.

Referring to FIG. 2, for the above two assumptions it follows that:

(XV)
$$\frac{(b-x)(x+c)}{b+c} = d_t - d_b$$

(where the left side of the equation is the resistance between the points 12 and 20.)
If $x = 0$, then XV becomes (XVI)
$$\frac{bc}{b+c} = d_t - d_b$$

From XIII and XIV the following is obtained:

(XVII)
$$\frac{bc}{b+c} = d_t - d_b$$

For the midpoint position of the slider on the linear potentiometer,
$$a = d + \frac{(d_t - d_b)}{2}$$

and (XVIII)
$$a - d = \frac{d_t - d_b}{2}$$

Equations X and XVIII are combined as follows:

(X)
$$b - x = \frac{(a-d)(b+c)}{c}$$

$$d - x = \frac{(d_t - d_b)(b+c)}{2c}$$

but
$$d_t - d_b = \frac{bc}{b+c} \text{ (Equation XVII)}$$

Then
$$b - x = \frac{\frac{bc(b+c)}{b+c}}{2c}$$

$$b - x = \frac{bc}{2c}$$

$$2b - 2x = b$$

$$b = 2x$$

$$x = \frac{b}{2}$$

From the foregoing it is seen that the potentiometer changes linearly when used with a linear transducer even though it is shunted by the resistor $c$ to give the desired resistance between its end terminals.

From Equation XI it is seen that $x$ is dependent on the expression $(a-d)$. Therefore, regardless of what the basic values of $a$ and $d$ are, the accuracy of the combination and bridge will remain constant just as long as the difference between $a$ and $d$ remains constant, and as long as the voltage connection of V is made at the terminal 18 which adjoins the transducer $d$. The two leads comprising the cable 44 may thus have any reasonable length and reasonable resistance, as long as the wires 46, 48 are of equal resistance.

Referring to FIG. 2, it will be noted that a portion of $b-x$ may be considered as in parallel with the portion $x$, and in series with the arm E. The series resistance represented by this will be zero if $c$ is infinite. However, for any other value of $c$, such series resistance will have some influence. This resistance which may be considered as in series with the arm E is $$\frac{(b-x)(c+x)}{b+xc+x}$$

(the resistance proportion is like the voltage proportion). Thus, the series resistance may be set forth as follows:

(XIX) $$R = \frac{(b-x)x}{b+c}$$

Letting $x = \frac{1}{2}b - y$, this becomes (XX) $$R = \frac{\left(\frac{1}{2}b - y\right)\left(\frac{1}{2}b + y\right)}{b+c}$$

This equals:

$$\frac{\left(\frac{1}{2}b\right)^2 - y^2}{b+c}$$

This resistance has its highest value when $y=0$, and for such condition $x$ will equal $\frac{1}{2}b$.

An example of the foregoing, using the same values already stated, (which are now repeated) is as follows:

The transducer $d$ has a low resistance value of 180 ohms at $-70°$, a high resistance value of 400 ohms at $150°$, and a center resistance of 290 ohms at $40°$. It is connected to a potentiometer having a resistance of 231 ohms which is shunted by a resistor $c$ of 4620 ohms.

From Equation XX, $$R = \frac{115.5(115.5)}{4851} = 2.75 \text{ ohms}$$

In order to obtain a reasonable accuracy in the bridge, E and $e$ are made so high that the 2.75 ohm value has no significant influence. If, for example, E is made to have a resistance of 28,000 ohms or higher, the error due to this cause is less than 0.01%. The higher the resistance of E, the less the accuracy is influenced by contact resistance. By actual tests, using a linear transducer as above set forth, the error due to this cause was less than 0.1° C. when changing the lead resistance to the transducer from 0 ohms to 400 ohms resistance at 40° C. (which temperature produces the greatest error).

Following are tables giving values of the linear transducer, instrument lead values from the transducer to the remainder of the bridge, the basic errors and the errors for substantially zero lead resistance and a lead resistance of 200 ohms, each wire.

TABLE I

| Ideal ohm Transducer | °C. | Actual ohm Transducer | Basic Error | Trans. & Instr. 0 Lead Resis. | Same with 200 ohms in ea. lead |
|---|---|---|---|---|---|
| 400 | 150 | 400.035 | +0.035 | +0.035 | +0.035 |
| 390 | 140 | 390.018 | +0.018 | +0.024 | +0.028 |
| 380 | 130 | 380.000 | 0.000 | +0.012 | +0.018 |
| 370 | 120 | 369.981 | −0.019 | −0.002 | +0.007 |
| 360 | 110 | 359.966 | −0.034 | −0.012 | −0.001 |
| 350 | 100 | 449.956 | −0.044 | −0.018 | −0.005 |
| 340 | 90 | 339.952 | −0.048 | −0.019 | −0.004 |
| 330 | 80 | 329.954 | −0.046 | −0.014 | +0.002 |
| 320 | 70 | 319.955 | −0.045 | −0.011 | +0.006 |
| 310 | 60 | 309.969 | −0.031 | +0.004 | +0.022 |
| 300 | 50 | 299.985 | −0.015 | +0.021 | +0.040 |
| 290 | 40 | 290.000 | 0.000 | +0.055 | +0.055 |
| 280 | 30 | 280.017 | +0.017 | +0.053 | +0.072 |
| 270 | 20 | 270.025 | +0.025 | +0.060 | +0.078 |
| 260 | 10 | 260.034 | +0.034 | +0.068 | +0.085 |
| 250 | 0 | 250.043 | +0.043 | +0.075 | +0.091 |
| 240 | −10 | 240.048 | +0.048 | +0.077 | +0.092 |
| 230 | −20 | 230.048 | +0.048 | +0.074 | +0.087 |
| 220 | −30 | 220.044 | +0.044 | +0.066 | +0.077 |
| 210 | −40 | 210.024 | +0.024 | +0.041 | +0.050 |
| 200 | −50 | 200.000 | 0.000 | +0.012 | +0.026 |
| 190 | −60 | 190.966 | −0.034 | −0.028 | −0.024 |
| 180 | −70 | 180.916 | −0.084 | −0.084 | −0.084 |

The instrument error was computed from Equation XX, using a value of 30,000 ohms for each of E and $e$, as follows: (the instrument error is in degrees centigrade)

TABLE II

| °C. | E arm Error | Multiplier | Multiplier× 600, −600, 200 ohm leads | Multiplier× 400, −400, 0 ohm leads |
|---|---|---|---|---|
| 50 | 40 | 2.750 | 1.0000917 | +0.055 | +0.037 |
| 60 | 30 | 2.727 | 1.0000909 | +0.055 | +0.036 |
| 70 | 20 | 2.659 | 1.0000886 | +0.053 | +0.035 |
| 80 | 10 | 2.545 | 1.0000848 | +0.051 | +0.034 |
| 90 | 0 | 2.386 | 1.0000795 | +0.048 | +0.032 |
| 100 | −10 | 2.182 | 1.0000727 | +0.044 | +0.029 |
| 110 | −20 | 1.932 | 1.0000644 | +0.039 | +0.026 |
| 120 | −30 | 1.636 | 1.0000545 | +0.033 | +0.022 |
| 130 | −40 | 1.295 | 1.0000432 | +0.026 | +0.017 |
| 140 | −50 | 0.090 | 1.0000303 | +0.018 | +0.012 |
| 150 | −60 | 0.477 | 1.0000159 | +0.010 | +0.006 |
| | −70 | 0.000 | 1.0000000 | 0.000 | 0.000 |

Under certain conditions of temperature of the transducer $d$, I may be equal to $i$. This condition would be a temperature of the transducer $d$ of 150° C., or of −70° C.

Variations and modifications may be made within the scope of the claims, and portions of the improvement may be used without others.

I claim:

1. An electrical bridge circuit comprising, in combination:
   (a) first and second adjoining arms having a common junction for connection to a voltage source,
   (b) said arms having commensurate resistance values,
   (c) a third arm and a resistive transducer having a common junction for connection to said voltage source,
   (d) said third and second arms having a common junction, (e) said transducer comprising the fourth bridge arm,
(f) a linear potentiometer and a shunt resistor connected across the ends of the potentiometer,
(g) said shunt resistor having a value to produce a predetermined desired resistance between the ends of the potentiometer,
(h) said first arm being connected to the slider of the potentiometer,
(i) one end of the potentiometer being connected to said transducer,
(j) an electro-responsive device connected between the remaining end of the potentiometer and the common junction of the second and third arms,
(k) said potentiometer being of high positive temperature coefficient of resistance material, and
(l) the shunt resistor being of negative temperature coefficient of resistance material to minimize the effects of changes in ambient temperature.

2. A bridge circuit as in claim 1, wherein:
(a) the potentiometer is of the continuously variable type.

3. A bridge circuit as in claim 1, wherein:
(a) the transducer has a linear characteristic.

4. A bridge circuit as in claim 3, wherein:
(a) the resistive transducer is disposed remote from the remainder of the bridge circuit, and
(b) there are long leads comprising a cable the resistance of which need not be an exact figure, connecting the transducer into the circuit.

5. A bridge circuit as in claim 4, wherein:
(a) the said long leads are constituted of wire having an appreciable temperature coefficient of resistance.

6. A bridge circuit as in claim 3, wherein:
(a) the transducer comprises three resistors connected in series,
(b) the resistance versus temperature curve of one of said resistors being concave upward,
(c) the resistance versus temperature curve of another of said resistors being concave downward, and
(d) the third resistor has a zero temperature coefficient of resistance.

References Cited by the Examiner
UNITED STATES PATENTS

| | | | |
|---|---|---|---|
| 1,192,911 | 8/1916 | Leeds | 338—25 |
| 2,098,650 | 11/1937 | Stein | 338—25 X |
| 2,276,816 | 3/1942 | Bagno. | |
| 2,724,759 | 11/1955 | Daniels | 338—120 X |

LOUIS R. PRINCE, *Primary Examiner.*

S. H. BAZERMAN, *Assistant Examiner.*